(12) United States Patent
Onno et al.

(10) Patent No.: US 8,756,638 B2
(45) Date of Patent: Jun. 17, 2014

(54) METHOD AND DEVICE FOR DISPLAYING IMAGES OF A VIDEO SEQUENCE

(75) Inventors: Patrice Onno, Rennes (FR); Fabrice Le Leannec, Mouaze (FR)

(73) Assignee: Canon Kabushiki Kaisha, Tokyo (JP)

( * ) Notice: Subject to any disclaimer, the term of this patent is extended or adjusted under 35 U.S.C. 154(b) by 1394 days.

(21) Appl. No.: 11/437,785

(22) Filed: May 22, 2006

(65) Prior Publication Data

US 2006/0279634 A1      Dec. 14, 2006

(30) Foreign Application Priority Data

May 23, 2005    (FR) ...................................... 05 05141

(51) Int. Cl.
*H04N 7/173*    (2011.01)

(52) U.S. Cl.
USPC .............................................. 725/90; 725/95

(58) Field of Classification Search
CPC ....................... H04N 21/4728; H04N 21/2662
USPC ................................................ 725/81, 95, 90
See application file for complete search history.

(56) References Cited

U.S. PATENT DOCUMENTS

| | | | |
|---|---|---|---|
| 6,536,043 B1 | 3/2003 | Guedalia ........................... | 725/90 |
| 6,698,021 B1 | 2/2004 | Amini et al. ................... | 725/105 |
| 2004/0078491 A1* | 4/2004 | Gormish et al. .............. | 709/247 |
| 2004/0120591 A1* | 6/2004 | Brower et al. ................. | 382/240 |
| 2004/0210604 A1* | 10/2004 | Li et al. ....................... | 707/104.1 |
| 2005/0104887 A1* | 5/2005 | Henocq et al. ................ | 345/473 |
| 2007/0216699 A1* | 9/2007 | Le Leannec et al. ......... | 345/555 |

OTHER PUBLICATIONS

Islam, Asad, Chebil, Fehmi; JPEG 2000 for Wireless Applications, Jan. 12, 2004, Proceedings of SPIE vol. 5203, pp. 255-271.*
Islam, Asad, Chebil, Fehmi; JPEG 2000 for Wireless Applications, Jan. 12 2004, Proceedings of SPIE vol. 5203, pp. 255-271.*
Islam, Asad, Chebil, Fehmi; JPEG 2000 for Wireless Applications, Proceedings of SPIE vol. 5203, pp. 255-271.*
Islam A., et al., "JPEG2000 for Wireless Applications", Proceedings of the SPIE, Bellingham, VA, US, vol. 5203, 2003, pp. 255-271.

* cited by examiner

*Primary Examiner* — Nasser Goodarzi
*Assistant Examiner* — Hyun Hong
(74) *Attorney, Agent, or Firm* — Fitzpatrick, Cella, Harper & Scinto

(57) ABSTRACT

A method of displaying images of a video sequence during the spatial navigation in the video sequence in order to pass from a first to a second viewing mode, in which the video sequence comprises encoded images continuously transmitted from a server (23) to a client machine. The method comprises the following steps, performed by the client machine, during the navigation between the first and second viewing mode: sending to the server at least one request for obtaining supplementary data with respect to images to be displayed (S205) which were received beforehand, and, while awaiting the reception of a response to said at least one request: processing according to the second viewing mode at least one image of current resolution $R_N$ to be displayed (S203), which was received and decoded beforehand, and displaying said at least one processed image (S204).

37 Claims, 12 Drawing Sheets

METHOD AND DEVICE FOR DISPLAYING IMAGES OF A VIDEO SEQUENCE

FIELD OF THE INVENTION

The invention concerns a method and a device for displaying images of a video sequence during the spatial navigation in the video sequence in order to pass from a first to a second viewing mode, the video sequence comprising encoded images continuously transmitted from a server to a client machine.

The present invention generally concerns the display of images of a video sequence after their decoding in case of change of viewing mode in the images of a video sequence and, more particularly, smoothly, rapidly and without interruption.

A favored but not exclusive application of the present invention that is particularly worthwhile is the display during the spatial navigation by the user in the images of the video sequence, such as during operations of zooming in, zooming out and panning. The display of images from video sequences is further to the transfer of those images in the context of a client-server architecture, for example in the field of video over the Internet. During operations of spatial navigation, the display must remain smooth.

BACKGROUND OF THE INVENTION

In this context, the data of the video sequence comprising the encoded images of the video are transmitted progressively from a remote server, via a network, to a "client" machine, in order to be displayed after decoding. This application is relative to "video streaming" applications.

"Video streaming" is a technique which makes it possible to transmit and display a video sequence in real time, i.e. without requiring the prior downloading of a video file before viewing it.

Different systems are known for display of a video sequence during spatial navigation in the images of that video sequence which is transmitted over a network.

These display systems are dependent on the response speed of the network. Thus, if the performance of the network is reduced, the reactivity of the system is low.

For example, when the user navigates within the images of a video sequence while performing, for example, zooming or panning operations, a navigation request reflecting the user's operation is transmitted to the server in order for it to be processed.

In response, the server again encodes the data of the images of the video sequence to be transmitted to that user, the encoding of the images of the video sequence having to be made taking into account the requested spatial navigation.

If the performance of the network is poor, the reactivity of the system is poor, which causes jerky or interrupted display of the re-encoded video sequence.

Consequently, according to this technique, in order to produce the spatial navigation requested by the user, the client machine sends a request for change comprising the parameters of spatial navigation to the server, the latter performs the recoding of the data of the video and re-sends the new encoded data to the client machine for them to be displayed. In this way, the system is dependent on the lags in transmission of the request and on the transfer time of the result of the request that are due to the performance of the network.

The following systems used for performing video streaming are also known: RealOne, Windows Media and Quick Time.

According to these systems, before streaming a video, the video sequence is encoded beforehand on the server from a video and audio file format, for example MPEG2, MPEG4, DIVX, into a file of format dedicated to video streaming. After this encoding, the video sequence is sent to one or more clients.

However, as these video sequences are encoded beforehand, it is no longer possible to perform the spatial navigation operations in the images of the video sequence, such as zooming and panning operations, when a video is in course of display.

This is because the video formats used in the aforementioned products do not permit spatial navigation in the video sequence.

Document U.S. Pat. No. 6,698,021 describes, furthermore, a control system for video surveillance cameras using a mechanism of video streaming.

According to this system, the user remotely controls a surveillance camera via an Internet browser. A graphical interface enables operations to be performed of zooming and of panning according to the rotational axes of the camera. The instructions from the user are sent to the camera in order then to be converted into the form of actions controlling the zoom of the camera or the motors of the device of the camera to perform the rotation of the camera about its rotational axes.

The term PTZ ("Pan/Tilt Zoom Camera") is then employed. These surveillance cameras, of which the zooming and panning operations are performed electronically, require a costly mechanical system with respect to a standard camera.

Furthermore, due to its type of operation, the PTZ system is constrained by the lag time of the network. More particularly, this time is dependent on the sending of the commands requested by the user to the camera then the reception of the images. Thus, to view a change on screen, a relatively long time is necessary.

SUMMARY OF THE INVENTION

The present invention aims to mitigate at least one of the aforesaid drawbacks by providing a method of displaying images of a video sequence during the spatial navigation in the video sequence in order to pass from a first to a second viewing mode, the video sequence comprising encoded images continuously transmitted from a server to a client machine. The method comprises the following steps, performed by the client machine, during the navigation between the first and second viewing mode:

sending to the server at least one request for obtaining supplementary data with respect to images to be displayed which were received beforehand, and, while awaiting the reception of a response to said at least one request:

processing according to the second viewing mode at least one image of current resolution $R_N$ to be displayed, which was received and decoded beforehand, and displaying said at least one processed image.

This displaying method is, in particular, based on the use of the images received beforehand for the purpose of processing and displaying them, while in parallel or pseudo in parallel sending new requests for supplementary data with respect to images which were received beforehand.

In this way, on passing from a first to a second viewing mode, the processing commences by means of images received beforehand and continues with the following images after having received supplementary data concerning them, enabling the operation desired by the user to be performed with good visual quality.

Thus, the spatial navigation in a video sequence is performed rapidly, without introducing lag during display, and avoiding interruptions. Moreover, this method permits pleasing viewing of a change of viewing mode by introducing progressive processing of the change in viewing mode.

Furthermore, by contrast to the prior art, this method enables the client machine to request only the missing data, thus representing a low volume of data.

According to a feature, the method further comprises the following steps:
receiving supplementary data in response to said at least one request, and
concatenating the supplementary data received respectively with the images to be displayed and which were received beforehand.

According to this feature, the received data are concatenated respectively with the images received beforehand. On processing of the images, the supplementary data make it possible to improve the visual rendition during the progressive passage from a first viewing mode to a second viewing mode.

According to one feature, the selection method comprises the following steps:
decoding encoded images to be displayed comprising supplementary data of images received in response to an earlier request,
processing at least one decoded image according to the second viewing mode, and
displaying said at least one processed image.

Thus, after having received supplementary data, the processing of the images is performed taking into account the received data, so improving the visual rendition during the progressive passage from a first to a second viewing mode.

According to another feature, the method further comprises the following steps:
storing the encoded images to be displayed in a first memory (BD) and,
storing the corresponding decoded images to be displayed in a second memory (BI) after their decoding.

In order to rapidly respond to the actions of the user, the method makes it possible to store in a first memory encoded images received beforehand, and in a second memory decoded images received beforehand. More particularly, when an action is made by the user, the processing operations commence with the images already received and stored, so avoiding an interruption of the display.

According to another feature, the passage from the first to the second viewing mode is performed on a predetermined batch of images.

According to a first variant embodiment, the spatial navigation consists of a zoom in.

According to a feature, the sending step comprises:
sending at least one request for obtaining quality supplementary data concerning a first batch of encoded contiguous images to be displayed in the video sequence,
sending at least one request for obtaining supplementary data relative to a higher resolution concerning a second batch of encoded contiguous images to be displayed, which, in the video sequence, follows said first batch of encoded contiguous images to be displayed.

One aspect of this first variant consists of sending at least one request for obtaining supplementary data of a quality concerning a first batch of images. Those supplementary data concern a small quantity of data and enable an enlargement to be made of higher quality.

Another aspect consists of sending at least one request in order to obtain supplementary data relative to a higher resolution concerning a second batch of images. Those data represent a greater volume of data than the volume of supplementary data requested earlier. However, they enable the enlargement requested by the user to be continued giving a very good visual quality.

According to another feature of this variant, at the end of the passage from the first to the second viewing mode, the decoded images to be displayed are displayed at a higher resolution than the current resolution.

According to a second variant embodiment, the spatial navigation consists of a zoom out.

According to a feature, the sending step comprises the sending of at least one request for obtaining supplementary data concerning the edges of the encoded images to be displayed which were received beforehand.

This is because the processing of the zoom out operation commences with the images stored beforehand. However, the edges of the images may be missing. Thus, a request is sent to the server to obtain the edges of the images received beforehand for the purpose of performing a zoom out of good quality.

According to another feature, on passage from the first to the second viewing mode, the decoded images to be displayed are displayed at a lower resolution than the current resolution.

According to one feature of this variant, at the end of the passage from the first to the second viewing mode, the decoded images to be displayed are displayed at a lower resolution than the current resolution.

According to another feature, the images of the decoded video sequence are deleted.

It is probable that the images received beforehand and already decoded and stored in memory BI are narrower than the encoded images stored in memory BD. Thus, by deleting the images already decoded, the decoding processing is again performed on those same images including the edges not decoded earlier.

According to a third variant embodiment, the spatial navigation consists of a pan in the images of the video sequence.

According to a feature of this variant, the sending step comprises the sending of at least one request for obtaining supplementary data concerning spatial regions of images to be displayed received beforehand corresponding to the pan and said spatial regions being located on the path of the pan.

During a pan, new L-shaped regions are to be displayed. In order to be capable of displaying the content of those L-shaped regions, at least one request is sent to the server for obtaining the content of the L-shaped regions located on the path of the pan.

According to a feature, the decoding of encoded images to be displayed is carried out at a resolution less than or equal to the current resolution.

According to a feature of this variant, the images decoded at a resolution less than or equal to the current resolution are extrapolated to reach the current resolution.

By extrapolating the images of a lower resolution to a higher resolution, a good idea of the content of the image of the new L-shaped region will be obtained.

According to a feature, the method further comprises a step of modifying the decoded images to be displayed by deleting the spatial regions not necessary for the display and by adding the supplementary data of the decoded spatial regions.

According to another aspect, the present invention also concerns a method of displaying images of a video sequence during the spatial navigation in the video sequence in order to pass from a first to a second viewing mode, the video sequence comprising encoded images continuously transmitted from a server to a client machine, that are performed by the client machine. The method comprises the following steps:

sending to the server at least one request for obtaining supplementary data concerning images to be displayed which were received beforehand, decoding encoded images comprising supplementary data of images which were received beforehand in response to said at least one request, processing according to the second viewing mode at least one decoded image of current resolution $R_N$ to be displayed, and displaying said at least one processed image.

This method has the same advantages as the method of displaying images of a video sequence briefly described above and these will therefore not be reviewed here.

The present invention concerns, furthermore, a device for displaying images of a video sequence during the spatial navigation in the video sequence in order to pass from a first to a second viewing mode, the video sequence comprising encoded images continuously transmitted from a server to a client machine. The device comprises the following means, adapted to be used by the client machine, during the navigation between the first and second viewing mode:

means for sending to the server at least one request for obtaining supplementary data with respect to images to be displayed which were received beforehand, means for processing according to the second viewing mode at least one image of current resolution $R_N$ to be displayed, which was received and decoded beforehand, and means for displaying said at least one processed image, said processing and displaying means being activated while awaiting the reception of a response to said at least one request.

This device has the same advantages as the method of displaying images of a video sequence briefly described above and these will therefore not be reviewed here.

According to another aspect, the present invention further concerns a device for displaying images of a video sequence during the spatial navigation in the video sequence in order to pass from a first to a second viewing mode, the video sequence comprising encoded images continuously transmitted from a server to a client machine, that are performed by the client machine, wherein it comprises the following means:

means for sending to the server at least one request for obtaining supplementary data concerning images to be displayed which were received beforehand, means for decoding encoded images comprising supplementary data of images which were received beforehand in response to said at least one request, means for processing according to the second viewing mode at least one decoded image of current resolution $R_N$ to be displayed, and means for displaying said at least one processed image.

This device has the same advantages as the method of displaying images of a video sequence briefly described above and these will therefore not be reviewed here.

According to other aspects, the invention also concerns a computer program for an implementation of the methods of the invention described briefly above as well as a telecommunication system.

DETAILED DESCRIPTION

The different aspects of the method and of the device according to the invention for the display of images of a video sequence in case of change of mode of spatial navigation in the video sequence from a first mode to a second mode of spatial navigation will now be described, by way of example, in the context of their application to the Motion JPEG2000 format. The images may also be sub-images, i.e. parts of images of larger format.

For further information concerning the Motion JPEG2000 format, see in particular the standard ISO/IEC 15444-3.

This method applies principally in the context of a client-server application in which the video data arrive progressively from a remote server via a network and are displayed, after being decoded, on a "client" station.

However, other forms of communication may be used.

The Motion JPEG2000 format makes it possible to extract spatial regions of images of a video sequence at variable resolutions and qualities. For example, from a high resolution video, it is possible to view a spatial region of that video sequence at a lower resolution and with a variable quality.

The communication protocol used between the client and the server makes it possible to exchange the data necessary for performing the display of the video sequence, from the server to the client machine.

To do this, the client specifies to the server information for defining the desired viewing window, in particular the size, the position of the viewing window, the resolution and the quality.

In response to the information from the client, the server provides the corresponding encoded data of the video sequence.

Similarly, the server may adapt the rate of the images of the video sequence supplied to the client, for example, by supplying only one image out of two, or even one image out of three, depending on the client's request.

The communication protocol called JPIP, which is a standard, was established in order to exchange information and data between a client and a server. This protocol is particularly well-adapted to the exchange of data of JPEG2000 or Motion JPEG2000 type.

For further information concerning the JPIP protocol, see in particular the document entitled "JPEG2000 image coding system—Part 9: Interactivity tools, APIs and protocols—Final Committee Draft", ISO/IEC JTC1/SC29 WG1 N3052, R. Prandolini, S. Houchin, G. Colyer, 25 Jul. 2003.

Other forms of video encoding that have good compression performance, but adopting the same characteristics as Motion JPEG2000, are in course of study and standardization, in particular MPEG-4 part10, Amendement 1, also termed SVC. The present invention is thus not limited to the Motion JPEG2000 format, but may we widely extended to formats having similar characteristics.

Figure 1:
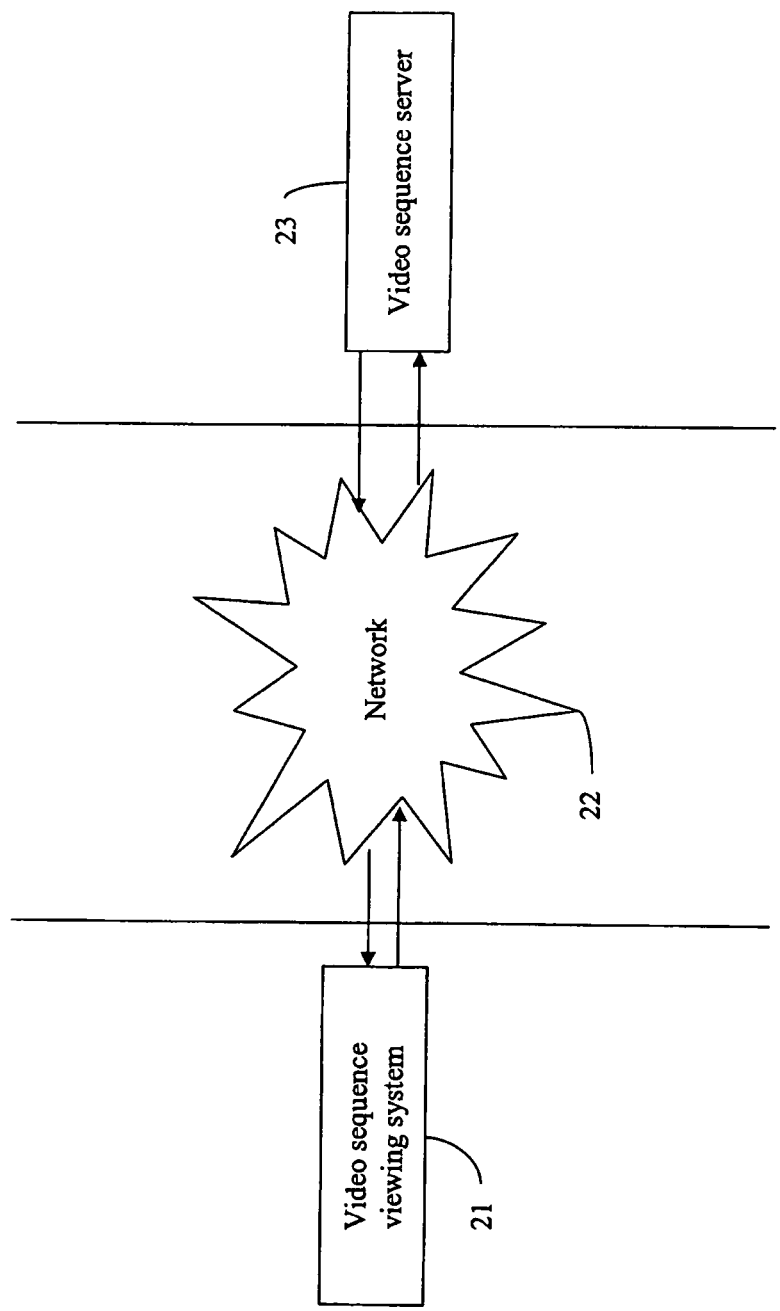
FIG. 1 shows a general view of a system for viewing a streamed video sequence.

FIG. 1 shows a general system for an application of client-server type, which comprises one or more servers 23 in which the video sequences are stored.

The video sequences are stored in a format enabling the transmission of video streams, in particular according to the Motion JPEG2000 format.

They are thus adapted to be loaded and viewed by one or more client machines 21.

The client machine contains the means necessary for communicating with a server via a network 22. The communication protocol used for selecting the parameters of the video and for transmitting the requests from the user is, for example, the JPIP protocol. This protocol is particularly well adapted, in particular for transporting video sequences, in Motion JPEG2000 format.

Furthermore, the client machine comprises a tool for viewing the video sequence, enabling it to perform operations of temporal navigation in the video sequence, for example, pause, fast forward, and replaying the sequence.

Similarly, the client tool enables operations of spatial navigation to be performed, in particular by providing the user with options for zooming in, zooming out and panning within the images of the video sequence.

According to this schema, when the user requests a navigation operation, whether it be temporal or spatial, a command is sent from the client to the server in order to for the latter to respond to the user command.

Figure 2A:
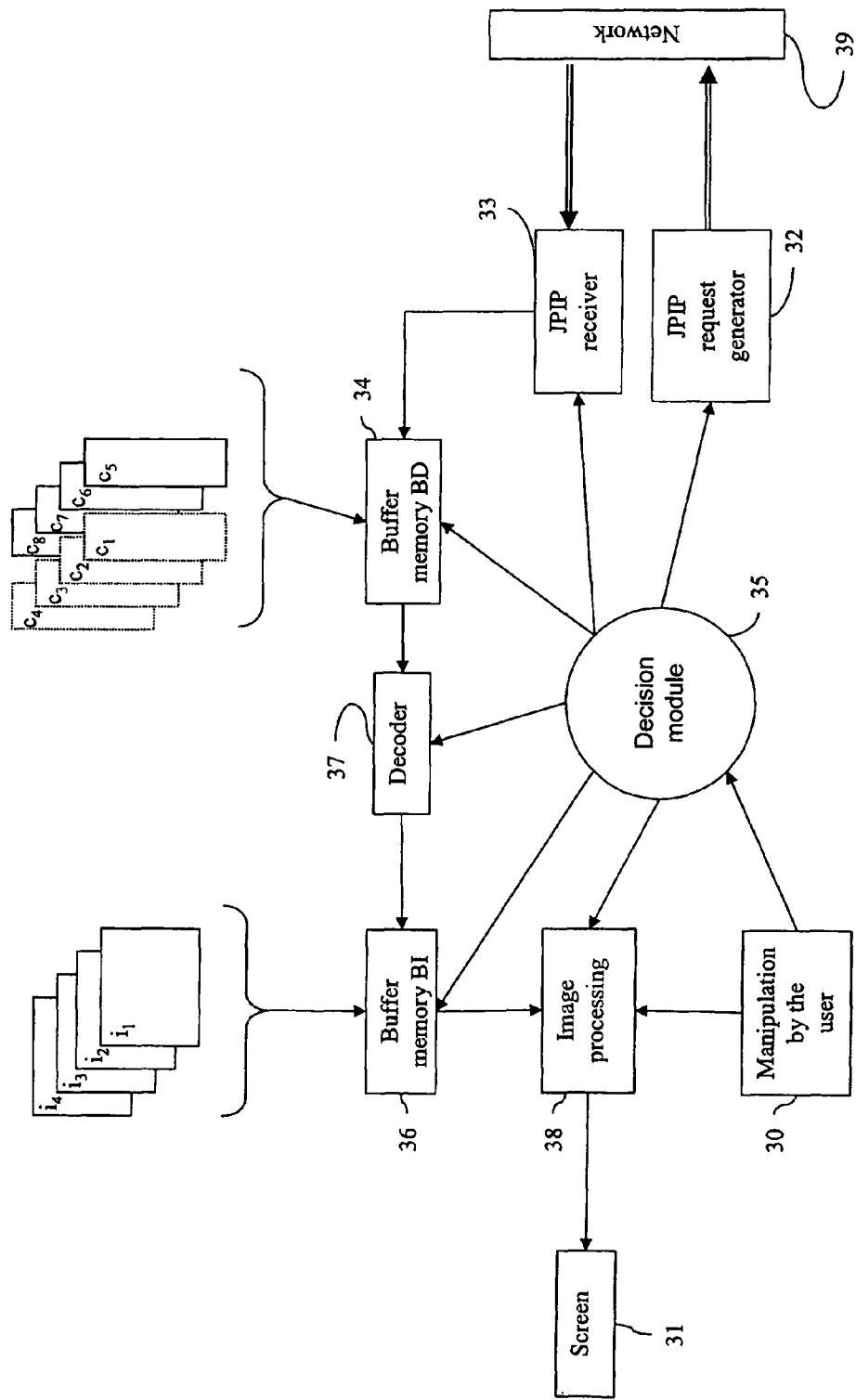
FIG. 2a shows a general view of a client device for displaying a video sequence according to the invention.
Figure 2B:
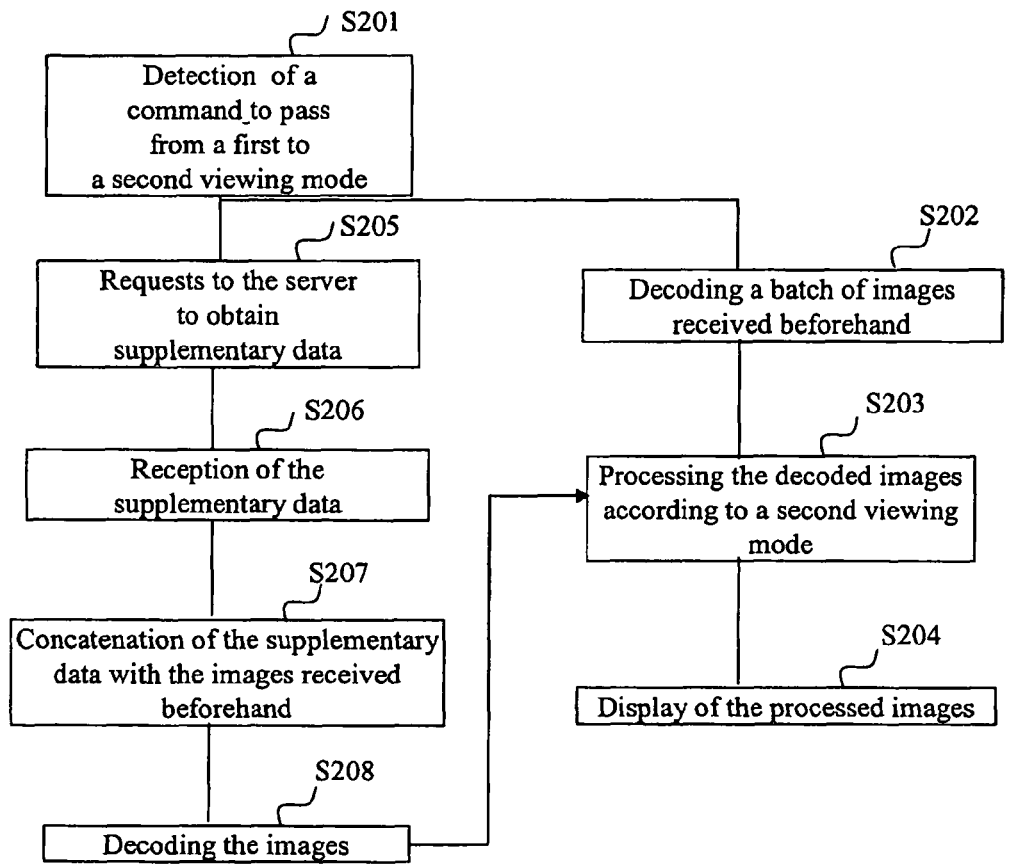
FIG. 2b is an algorithm of an embodiment of the method of displaying images of a video sequence during the spatial navigation in the video sequence according to the invention.

FIG. 2a illustrates the different means present in a client machine and FIG. 2b illustrates the algorithm present in the client machine and depending on the means of FIG. 2b for implementing the invention.

The system according to the invention depends on the use of two buffer memories (BD and BI). The first memory BD stores the encoded images of the video sequence received from the server for them to be decoded. The second buffer memory BI temporarily stores the decoded images for them to be displayed or for them to be processed prior to them being displayed.

The presence of these two memories will, for a spatial navigation operation commanded by the user, contribute to rapidly responding to the user's action user while producing a pleasing graphical rendition, and without introducing a lag in the response to the user's command.

More particularly, it is then possible to navigate in the images of the video sequence and thus to pass from a first viewing mode to a second viewing mode in accordance with the commands of the user, while performing the operations progressively.

To do this, the system comprises means interaction 30 enabling the user to select a navigation operation. The algorithm of FIG. 2b commence with step S201 during which the operation requested by the user is detected. Next, the algorithm continues by beginning to process images already stored in the buffer memories.

Thus, a batch of encoded images already received is decoded (step S202) using decoding means described below to then be processed according to the second viewing mode (step S203) by processing means also described below.

The processed images are next displayed (step S204) by displaying means on the client machine which are, for example, a screen 31.

New requests are also sent to the server in order to request supplementary data (step S205). These requests may be sent in parallel to the processing of the stored images. The requests and the processing of the images are indeed carried out in parallel when the hardware architecture is adapted. Otherwise, for example when the hardware architecture is monoprocessor-based, the operating system enables several tasks to be carried out virtually simultaneously, so giving the illusion of parallel processes; the term pseudo parallel is then used.

The new requests are sent to the server, depending on the data necessary for achieving the operation selected by the user.

These data concern in particular the size of the viewing window, the spatial region required, the resolution, the frame rate, and the quality of the images.

The requests also comprise an item of information for identification of the images of the sequence on which supplementary data are required.

These requests are produced by means of a request generator 32 which converts the navigation operations of the user into JPIP requests.

After processing of the requests by the server 23 of FIG. 1, that server sends the requested data to the client machine.

The responses to the requests of the client machine are received (step S206) by the JPIP receiver means 33. These responses comprise the supplementary data, in particular images or portions of images in encoded form.

On reception of these supplementary data, the operations necessary for implementing the commands of the user will continue progressively with the use of the images received beforehand and the supplementary data.

These supplementary data are next concatenated respectively with the encoded images received beforehand (step S207) in order to be decoded (S208).

The encoded images of the video sequence which have been received are temporarily stored in the first buffer memory BD 34 of size MD. The size of this buffer memory makes it possible, for example, to store 8 encoded images.

Decision means 35 enable the sending of the JPIP requests to the server to be regulated in order for the buffer memory BD to be constantly full.

At step S202, the decoding means 37 (decoder) decode a first batch of images received beforehand, while at step S208, those same decoding means decode the images received beforehand to which supplementary data have been concatenated.

The second memory BI 36 will store the decoded images.

Thus, when an encoded image $c_i$ is available in memory BD and when memory BI comprises at least one free location, image $c_i$ may be decoded by the decoding means 37.

The decoded images are next temporarily stored in the buffer memory BI 36. The size MI of that buffer memory BI is, for example, such that it can store half of the set of the encoded images stored in memory BD, i.e., in the example envisaged, four decoded images.

According to one embodiment, the system is such that the decoded images stored in memory BI are kept in memory in buffer memory BD.

Thus, with reference to FIG. 2a, the encoded image $c_1$ corresponds to the encoded data necessary for reconstructing the image $i_1$. The same applies for the following pairs $c_2/i_2$, $c_3/i_3$ and $c_4/i_4$.

The decoding of the images $c_i$ by the decoding means 37 is performed for as long as the buffer memory BI 36 is not filled.

The decoded images contained in the buffer memory BI are ready to be processed by the processing means 38. These means perform the necessary graphical processing operation or operations on the decoded images (step S203) and display the decoded and processed images on the screen 31 (step S204).

The display of the decoded and processed images is carried out at a specified frame rate, for example 25 images per second.

When an image is loaded into the processing means 38, it is deleted from the buffer memory BI 36 and from the buffer memory BD 34, so freeing memory space for a new image in each memory.

In this way, the display system self-regulates via the two buffer memories BI and BD to correctly display the images at the desired frame rate.

The desired frame rate is maintained if the transmission time of the data for an encoded image between the server and the client device and the decoding time for an encoded image is faster that the frame rate. In the opposite case, the frame rate is not complied with.

The use of a buffer memory BD makes it possible to avoid the problems of display in case of perturbations in the transmission caused by the network. More particularly, the throughput characteristics of the network often have little constancy over time, or are even very variable.

It will be noted that the value of the size MD of the buffer memory BD and the value of the size MI of the buffer memory BI may be variable and may depend on the hardware capability of the client machine.

The sizes of the buffer memories BD and BI may be re-dimensioned according to the characteristics of the network and more particularly the throughput of that network.

These actions of dimensioning and re-dimensioning are performed by the decision means 35.

Moreover, decision means 35 may modify certain choices of the user to enable proper and smooth display for the purpose of compensating for the fluctuations in throughput over the network.

Thus, the decision means 35 may, for example, reduce the frame rate or request the server to transmit only a few images, or to reduce the quality to reduce the transmission time of the encoded data between two images.

Figure 3A:
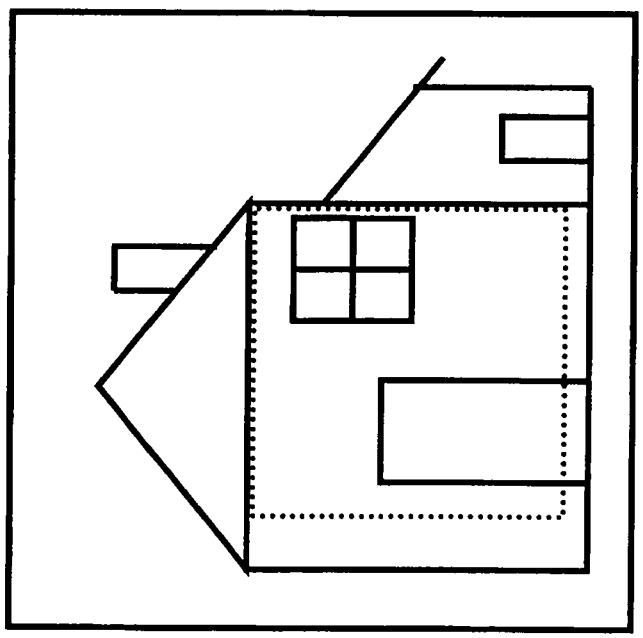
FIG. 3a is a diagrammatic representation of a full resolution digital image IM.

FIG. 3a is a diagrammatic representation of a full resolution digital image IM of a video sequence in Motion JPEG2000 format stored on a server. Each of the images of the video sequence is encoded according to JPEG2000 format.

The JPEG2000 format is a format for encoding each image taken individually, without any temporal prediction technique. This encoding format has the advantage of enabling the extraction of spatial sub-parts of each image of the sequence without however decoding the entirety of the encoded data of the image.

Each image is divided into a plurality of spatial regions and decomposed into elementary entities by a spatio-frequential transformation circuit which is a dyadic decomposition circuit with several levels of decomposition. The transformation circuit may implement one or more spatio-frequential transformations. For example, a wavelet transformation may be used.

A transformation circuit is, in this embodiment, a conventional set of filters, respectively associated with decimators by two, which filter the image signal in two directions, into high and low spatial frequency sub-band signals. The relationship between a high-pass filter and a low-pass filter is often determined by the conditions for perfect reconstruction of the signal. It is possible for the filters for vertical and horizontal decomposition not to be identical, even though in practice this is generally the case. The transformation circuit comprises, in particular, three successive analysis circuits for decomposing the image IM into sub-band signals with four decomposition levels.

Generally, the resolution of a signal is the number of samples per unit length used for representing that signal. In the case of an image signal, the resolution of a sub-band signal is related to the number of samples used per unit length for representing that sub-band signal horizontally and vertically. The resolution depends on the number of decompositions made, the decimation factor and the initial image resolution.

The first analysis circuit receives the digital image signal IM and, in known manner, delivers as an output four sub-band signals $LL_4$, $LH_4$, $HL_4$ and $HH_4$ with the highest resolution $R_4$ in the decomposition.

The sub-band signal $LL_4$ comprises the components or samples of low frequency, in both directions, of the image signal. The sub-band signal $LH_4$ comprises the components of low frequency in a first direction and of high frequency in a second direction. The sub-band signal $HL_4$ comprises the components of high frequency in the first direction and the components of low frequency in the second direction. Finally, the sub-band signal $HH_4$ comprises the components of high frequency in both directions.

Each sub-band signal is a set of real samples (which could also be integers) constructed from the original image, which contains information corresponding to a respectively vertical, horizontal and diagonal orientation of the content of the image, in a given frequency band. Each sub-band signal can be likened to an image.

The sub-band signal $LL_4$ is analyzed by an analysis circuit similar to the previous one in order to supply four sub-band signals $LL_3$, $LH_3$, $HL_3$ and $HH_3$ of resolution level $R_3$.

The sub-band signal $LL_3$ is analyzed by a similar analysis circuit in order to supply four sub-band signals $LL_2$, $LH_2$, $HL_2$ and $HH_2$ of resolution level $R_2$.

Each of the sub-band signals of resolution $R_2$ also corresponds to an orientation in the image.

The sub-band signal $LL_2$ is analyzed by an analysis circuit similar to the previous one in order to supply four sub-band signals $LL_0$ (by convention), $LH_1$, $HL_1$ and $HH_1$ of resolution level $R_1$. It will be noted that the sub-band $LL_0$ by itself forms the low frequency resolution $R_0$.

Each of the sub-band signals of resolution $R_1$ also corresponds to an orientation in the image.

Figure 3B:
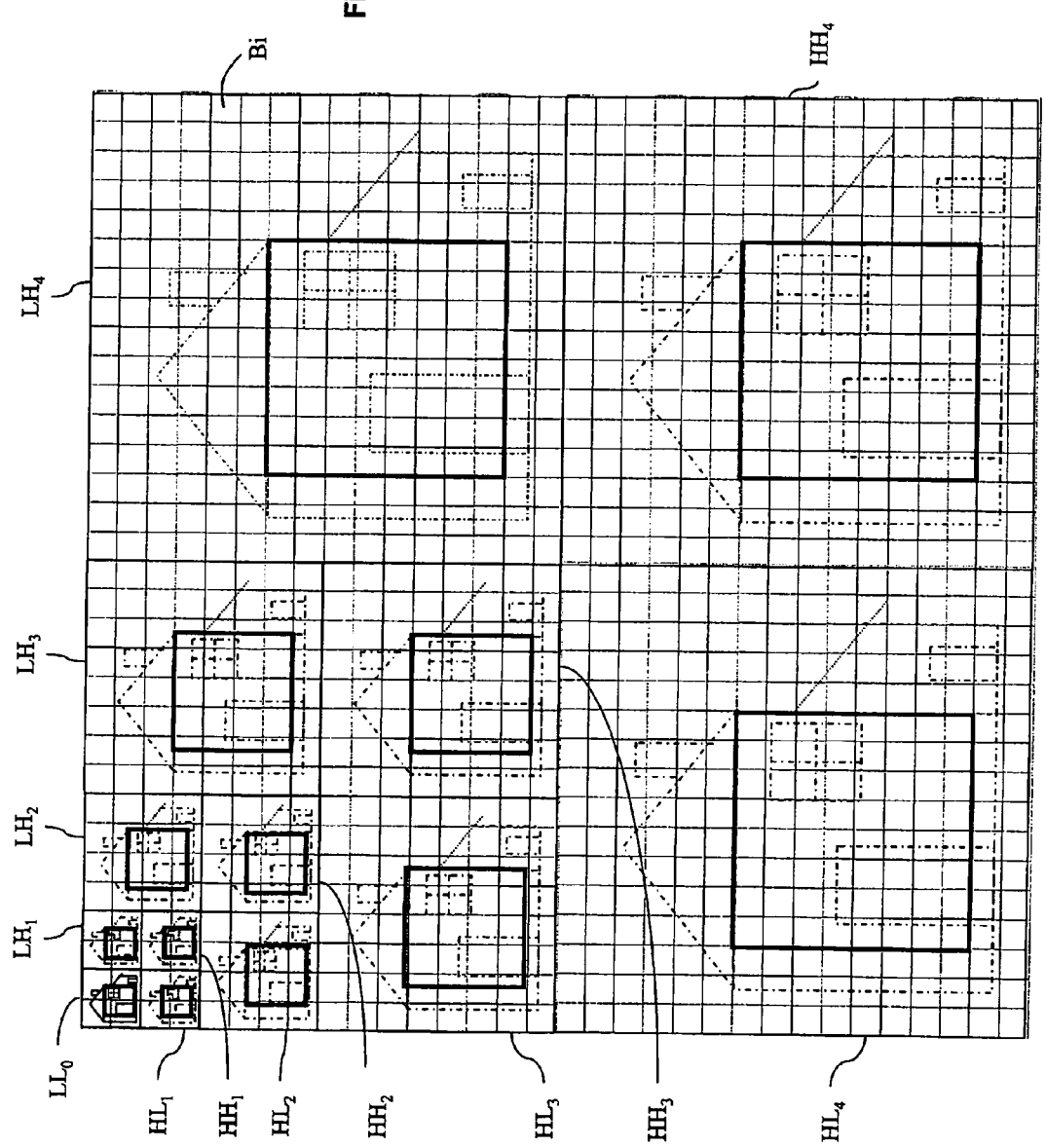
FIG. 3b is a diagrammatic representation of the decomposition of the digital image IM.

FIG. 3b represents the image IMD resulting from the spatio-frequential transformation applied to the image IM of FIG. 3a by the transformation circuit, into ten sub-bands and with five resolution levels: $R_0$ ($LL_0$), $R_1(LL_2)$, $R_2$ ($LL_3$), $R_3$ ($LL_4$), $R_4$ (original image). The image IMD contains as much information as the original image IM, but the information is divided according to frequency into four decomposition levels.

Naturally the number of decomposition levels and consequently of sub-bands can be chosen differently, for example sixteen sub-bands over six resolution levels, for a bidimensional signal such as an image. The number of sub-bands per resolution level can also be different. In addition, it is possible for the decomposition not to be dyadic. The analysis and synthesis circuits are adapted to the dimension of the signal processed.

In FIG. 3b the samples resulting from the transformation are stored sub-band by sub-band.

It will be noted that each sub-band of the image IMD is partitioned into blocks of samples.

A precinct comprises the set of the blocks Bi corresponding to the same spatial region or portion of spatial region in a given resolution i.e. in the set of the frequency sub-bands of that resolution.

The transformation circuit may possibly be connected to a quantization circuit, which, for example, implements a scalar or vector quantization.

The quantization circuit is connected to an entropy encoding circuit, which performs an entropy encoding, for example a Huffman encoding, or an arithmetic encoding of the data quantized by the quantization circuit.

The quantization and entropy encoding circuits are applied independently to each block of each sub-band considered.

The encoded image signal thus conveys blocks of samples obtained by encoding of the original samples and which constitute the bitstream—bitstream being the term used below.

When the image signal is in accordance with the JPEG2000 standard, these blocks of samples are known as codeblocks.

The encoded image signal also comprises a header which includes in particular the information concerning the size of the image, i.e. its width and its height, its position in a frame of reference, as well as the number of resolutions Rmax of that image.

The size of the spatial regions for each sub-band at a given resolution is determined by two parameters signaled by markers in the bitstream of the image signal in accordance with the JPEG2000 standard.

If it is desired to reconstruct the image of FIG. 3a with a resolution immediately below, it is of no use to transmit the data of resolution 4 i.e. the encoded data of the sub-bands $LH_4$, $HL_4$ and $HH_4$. The data of level 3 will be eliminated to obtain a resolution that is still lower.

Figure 4:
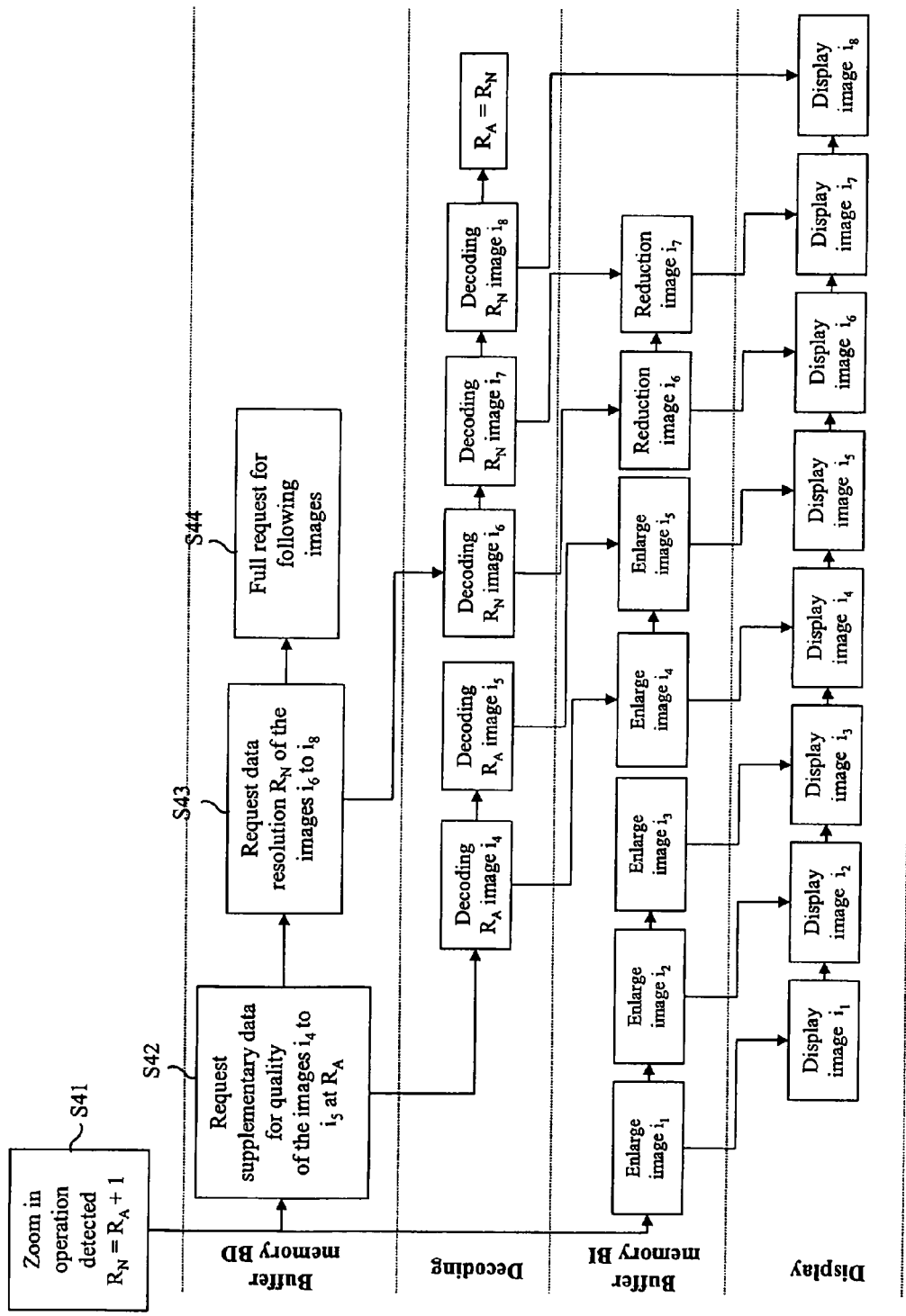
FIG. 4 shows the operations to perform in order to zoom in according to the invention.

With reference to FIG. 4, the actions performed when the user requests a zoom in operation are described.

According to the example considered, the zoom factor is 2.

Thus, FIG. 4 illustrates the different operations carried out in order to progressively pass from one image $i_0$ of zoom factor equal to 1 to an image $i_8$ of zoom factor equal to 2, the image $i_0$ being either a complete image, or a sub-image, i.e. a part of another image.

In the particular case of a zoom in by 2, one solution could consist of formulating a request to the server to obtain the encoded data of the resolution immediately above of the images to be displayed, to decode them and then to display them. However, this solution causes a considerable delay which is not acceptable in the applications envisaged.

According to the invention, the display must not freeze while awaiting complementary data but must, on the contrary, progressively perform the zoom requested over several images.

Thus, as soon as the zoom in action is detected, a variable $R_N$ representing the new display resolution of the images is initialized to the current resolution $R_A$ incremented by 1 (step S41).

Next, the operations illustrated in FIG. 4 are performed in parallel according to the availability of the data.

The first operation consists of creating and sending at least one request to the server providing the video sequence in order to obtain supplementary data with respect to images to be displayed which have been received beforehand (step S42).

In this connection, as the throughput of the network is unstable, the transmission of data is the weak point of the architecture. For this reason, the first operation consists of requesting the server for supplementary data which are to be transferred.

The supplementary data requested concern data of the quality of resolution $R_A$ which will be provided to complete encoded images stored in the buffer memory BD.

For example, these requests concern a batch of contiguous encoded images in the video sequence to be displayed, for example, the encoded images $i_4$ and $i_5$ stored in the memory BD of FIG. 4.

The supplementary data concern quality information representing a low volume of data.

These data, at the time of the zoom in operation, enable a good quality of enlargement to be obtained.

This is because an enlargement performed solely on the basis of the data of images already stored of resolution $R_A$ would result in an unpleasing visual rendition, whereas the quality supplementary data provide the information necessary for producing an enlargement of better quality.

On reception of the quality supplementary data, these are concatenated respectively with the encoded images to be displayed that were received beforehand and stored in the buffer memory BD.

The following operation consists of sending at least one new request in order to obtain supplementary data relative to the higher resolution $R_N$ (step S43).

These requests concern, in particular, a second batch of contiguous encoded images to be displayed which, in the video sequence, follows the first batch of contiguous encoded images to be displayed, for example, the encoded images $i_6$ to $i_8$ stored in the memory BD of FIG. 2a.

On reception of the supplementary data concerning data of higher resolution $R_N$, they are respectively concatenated with the encoded images stored in the buffer memory BD.

The following requests sent to the server are those sent when operation is normal. Thus, the object of those requests is to request complete images of resolution $R_N$ concerning the following images of the video sequence (step S44).

After the reception of quality supplementary data concerning a first batch of encoded contiguous images in the video sequence to be displayed, for example concerning the encoded images $i_4$ to $i_8$, the decoding means 37 commence decoding of those images.

Once the images have been decoded, they will be stored in the buffer memory BI so long as the memory of the buffer memory is not full, while waiting for them to be processed and displayed.

However, during the decoding, only the part of the image necessary to display, also termed window, is decoded.

This is because it is of no use to decode the entirety of the image, i.e. information not useful for the operations of enlargement or reduction performed by the processing means 38.

Table 1 given below comprises examples of values of decoding window sizes as well as the decoding resolution for each image.

The size of the window defined for the decoding also corresponds to the final size of the image in the buffer memory BI.

At the end of the decoding of the image $i_8$, the value of the resolution $R_A$ may then take the value of the resolution $R_N$.

The decoded images, stored in the buffer memory BI, are next extracted from the buffer memory BI in order for them to be processed and displayed.

The extraction of a decoded image from the buffer memory BI also leads to the extraction of the corresponding encoded image from the buffer memory BD.

In parallel with the requests sent by the client machine to the server, during the zoom operation requested by the user, the processing means 38 start the processing of the images stored in buffer memory BI in order for them to be displayed.

The processing carried out consists of enlarging or reducing the decoded images according to the resolution of the decoded images.

In the example of a zoom in by a factor of 2, the processing operations performed on each of the images $i_x$, for a series of images are stated in Table 1 below:

TABLE 1

Processing carried out on the images for a zoom in by a factor of 2.

| Image | Resolution | Size of the decoded window | Processing/factor | Final size |
|---|---|---|---|---|
| $i_0$ | $R_A$ | 100 × 100 | None | 100 × 100 |
| $i_1$ | $R_A$ | 88 × 88 | Enlargement: r = 1.125 | 100 × 100 |
| $i_2$ | $R_A$ | 80 × 80 | Enlargement: r = 1.25 | 100 × 100 |
| $i_3$ | $R_A$ | 73 × 73 | Enlargement: r = 1.375 | 100 × 100 |
| $i_4$ | $R_A$ | 67 × 67 | Enlargement: r = 1.5 | 100 × 100 |
| $i_5$ | $R_A$ | 62 × 62 | Enlargement: r = 1.625 | 100 × 100 |
| $i_6$ | $R_N$ | 115 × 115 | Reduction: r = 0.875 | 100 × 100 |
| $i_7$ | $R_N$ | 107 × 107 | Reduction: r = 0.9375 | 100 × 100 |
| $i_8$ | $R_N$ | 100 × 100 | None | 100 × 100 |

The operations of enlargement and reduction are considered as instantaneous and thus do not introduce any additional delay for the display.

According to the invention, the series of operations already described (steps S41 to S44) makes it possible for the graphical processing operations on the images already stored in the buffer memory BI to be started, and then to continue the processing operations on the following images after receiving supplementary information.

Moreover, given that the requests sent to the server consist of requesting supplementary data of small volume, those data are transmitted from the server to the client machine rapidly in order then to be concatenated and stored in the buffer memory BD.

It should be noted that the dimensioning of the buffer memories BI and BD, in terms of size, enables a progressive zoom to be performed over a given number of images, for example from image $i_0$ to image $i_8$, without however stopping the display of the video sequence.

It is also possible to modify the number of images over which quality supplementary data are requested (step S42) and the number of images over which resolution supplementary data are requested (step S43) by postponing or advancing the change in processing of the images according to the images and the characteristics of the network. Thus, in the example considered in FIG. 4, quality supplementary data are requested (step S42) for the images $i_1$ to $i_5$ and resolution supplementary data (step S43) for the images $i_6$ to $i_8$. However, the range of images over which steps S42 and S43 apply may be modified in order to adapt the processing operations to the performance of the communication network.

Figure 5:
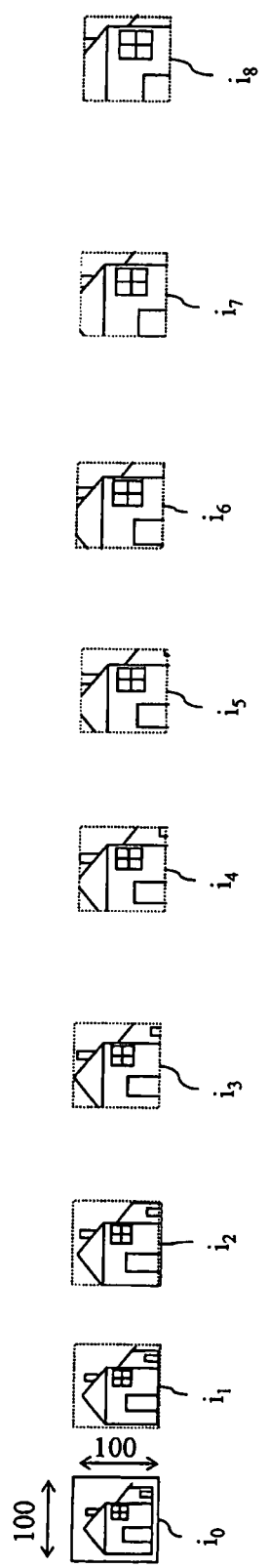
FIG. 5 is an example of a zoom in achieved according to the method of zooming in of the invention.

FIG. 5 shows the graphical rendition of the zoom in, i.e. the progressive display, during a factor 2 zoom in operation according to the invention.

The viewing window of size 100×100 is illustrated by means of a square shown in dotted line.

For simplicity, the central point of the zoom is fixed here at the center of the viewing window.

As shown in Table 1 above, image $i_0$ is the initial image with respect to which the user requests a zoom in by a factor of 2. This image is of resolution $R_A$, the image $i_0$ being either a whole image, or a sub-image, i.e. a part of an image.

As from the following image, the zoom in operation is initiated.

Thus, image $i_1$ is decoded at the resolution $R_A$ and stored in the memory BI in the format 88×88. The processing means 38 perform an enlargement by a factor of 1.125 in order to obtain a display size of the image $i_1$ of 100×100.

Similarly, the images $i_2$ and $i_3$ are respectively decoded in the format 80×80 and 73×73 in order then to be stored in the buffer memory BI. These images are of resolution $R_A$. Next, these images are enlarged by a factor respectively of 1.25 and 1.375 in order to be displayed at a size of 100×100.

During this processing, the quality supplementary data required from the server have been received and are concatenated with the respective images in the buffer memory BD, as represented in FIG. 4.

Thus, the following images $i_4$ and $i_5$ are decoded at the resolution $R_A$ taking into account the supplementary data received. The window for decoding those images is respectively of size 67×67 and 62×62. Next, these images are enlarged by a factor respectively of 1.5 and 1.625 in order to be displayed at a size of 100×100.

Similarly, during this processing, the higher resolution supplementary data required from the server have been received and are concatenated with the respective images in the buffer memory BD, as represented in FIG. 4.

Thus, the following images $i_6$ and $i_7$ are decoded at the resolution $R_N$ by means of the supplementary data received. The decoding window is respectively of size 115×115 and 107×107. Next, these images are reduced by a factor respectively of 0.875 and 0.9375 in order to be displayed at a size of 100×100.

Finally, image $i_8$ of resolution $R_N$ is decoded and displayed as well as the following images of the video sequence.

Figure 6:
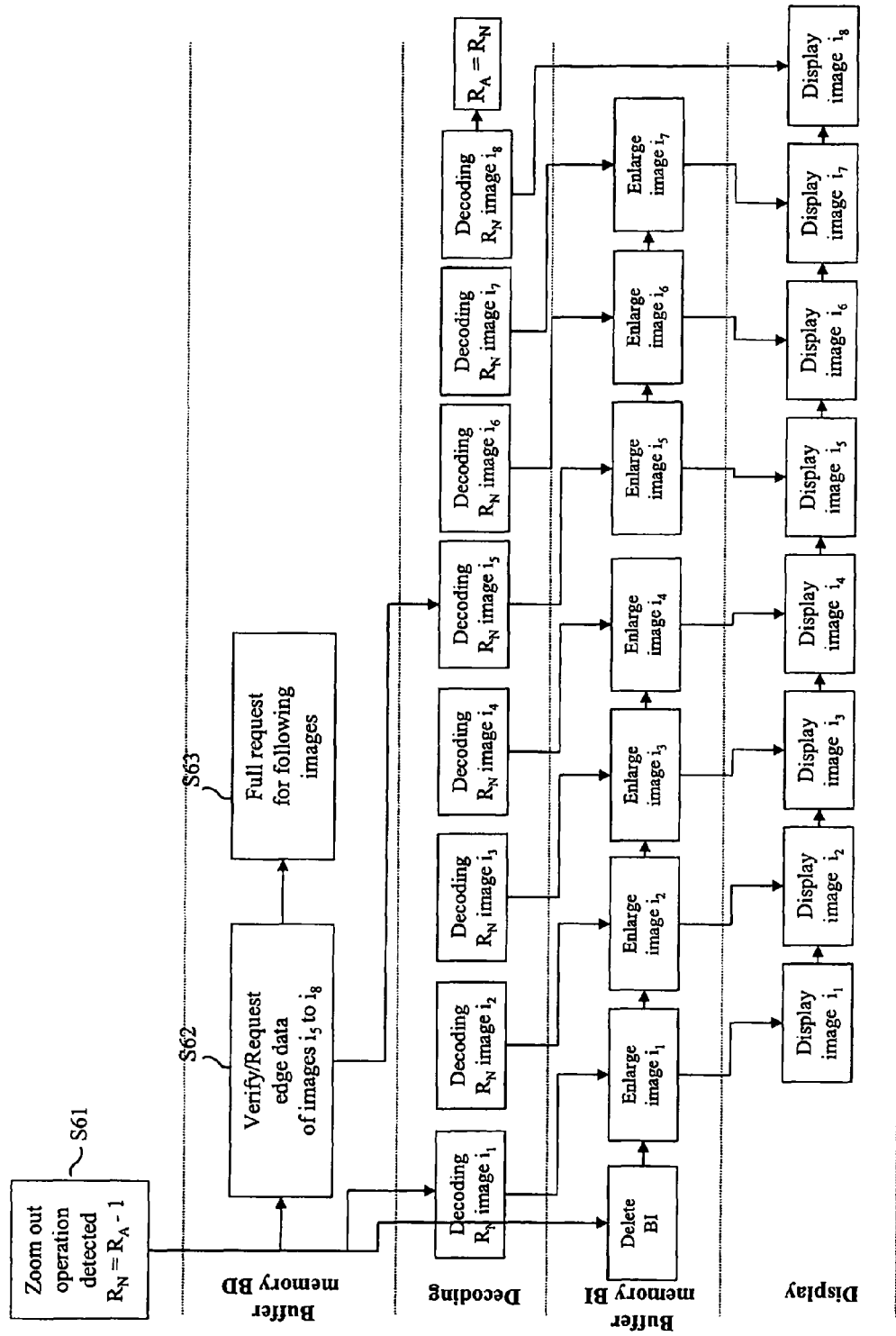
FIG. 6 shows the operations to perform in order to zoom out according to the invention.

With reference to FIG. 6, a description will be given of the operations to perform for a factor 2 zoom out operation requested by the user.

In the same way, in order not to suspend the display of the video sequence, the processing operations will be initiated, and at least one request is sent to the server in order to request supplementary data.

The processing operations commence with the updating of the variable indicating the resolution of the decoded images. Thus, the new resolution $R_N$ takes the value of the current resolution $R_A$ decremented by one unit (step S61).

This step is followed by a verification step making it possible to determine whether the data missing on decoding are present or not in the buffer memory BD (step S62).

Given that the transmission unit is the elementary entity as described earlier, it is possible that the data which have been identified as being necessary to perform the zoom out operation and corresponding to the edges of the images, have been transmitted already.

This is because it is possible for the size of the window projected in the different resolutions not to coincide with the predefined size of the elementary entities, since, on transmission of the encoded images, the client machine in general receives more data than the minimum data necessary for the display.

In FIG. 3b a window of the image to be displayed is represented which does not coincide with the blocks of each frequency sub-band.

If, at the verification step, it is determined that there are data missing for the display of the images, at least one request is sent from the client machine to the server in order to obtain supplementary data of resolution $R_N$.

These supplementary data concern the edges of the images of a batch of images of the video sequence to be displayed and stored in a buffer memory, in particular, in the buffer memory BD.

According to the example, the requests concern the images $i_5$ to $i_8$ in order to enable them to be displayed at the resolution $R_N$.

Data may also be missing with respect to the preceding images $i_1$ to $i_4$. However, it is assumed that the value of these data is zero. This is because, after the zoom out operation, the images $i_1$ to $i_4$ are of 50×50 format at resolution $R_N$. Thus 3 lines and 3 columns of pixels are missing for image $i_1$, 7 lines and 7 columns for image $i_2$, 11 lines and 11 columns for image $i_3$ and 17 lines and 17 columns for image $i_4$. The value zero is attributed to the missing data. Next, by means of reconstruction filters, the wavelet transform will smooth those values and blur the edges.

The quality of the images at their edges is slightly affected but, as this region is limited, it is of low perceptibility for the user.

On the other hand, for images $i_5$ to $i_8$, since that region becomes increasingly large, it is necessary to request the missing data (step S62).

Concerning the images following image $i_8$, the process of request sending for the obtainment of complete data for the region of the image to be displayed recommences (step S63).

On processing of the zoom out, a prior operation is executed consisting of emptying the buffer memory BI containing decoded images. Those images will be decoded again on the basis of the encoded data of the images contained in the buffer memory BD.

Furthermore, the decoding of the encoded images stored in the buffer memory BD is carried out in parallel to the operations already described consisting of sending requests to the server in order to obtain supplementary information.

The decoding is carried out at the resolution $R_N$. The size of the windows for decoding at the resolution $R_N$ is given, by way of example, in Table 2 shown below.

As illustrated in FIG. 6, the encoded images $i_1$ to $i_4$ are, in a first phase, decoded. As soon as the supplementary data concerning the encoded images $i_5$ to $i_8$ have been received and concatenated respectively with the encoded images $i_5$ to $i_8$ in the buffer memory BD, the decoding of these encoded images is carried out.

In principle, the supplementary data requested for a batch of images already stored are received before the decoding of the images preceding this batch of images in order for the display of the video sequence to be smooth.

As previously described with reference to the processing of the zoom in, the size of the buffer memories BD and BI is adjusted as closely as possible by the decision means 35 according to the average throughput of the communication network.

After the decoding of the images, they are stored in the buffer memory BI. Next, those images are extracted in order to be processed and displayed by the means 38 and 31.

Table 2 gives an example of processing to be performed on each of the images $i_0$ to $i_8$ of the video sequence in order to perform zoom out by a factor of 2.

TABLE 2

Processing carried out on the images for a zoom out by a factor of 2.

| Image | Resolution | Size of the decoding windows | Processing/factor | Final size |
|---|---|---|---|---|
| $i_0$ | $R_N$ | 100 × 100 | None | 100 × 100 |
| $i_1$ | $R_N$ | 53 × 53 | Enlargement: r = 1.875 | 100 × 100 |
| $i_2$ | $R_N$ | 57 × 57 | Enlargement: r = 1.75 | 100 × 100 |
| $i_3$ | $R_N$ | 61 × 61 | Enlargement: r = 1.625 | 100 × 100 |
| $i_4$ | $R_N$ | 67 × 67 | Enlargement: r = 1.5 | 100 × 100 |
| $i_5$ | $R_N$ | 72 × 72 | Enlargement: r = 1.375 | 100 × 100 |
| $i_6$ | $R_N$ | 80 × 80 | Enlargement: r = 1.25 | 100 × 100 |
| $i_7$ | $R_N$ | 88 × 88 | Enlargement: r = 1.125 | 100 × 100 |
| $i_8$ | $R_N$ | 100 × 100 | None | 100 × 100 |

As for the zoom in operation, the invention enables the data stored beforehand in the buffer memories BI and BD to be exploited to the maximum extent in order to smoothly display the video while performing the zoom out.

Figure 7:
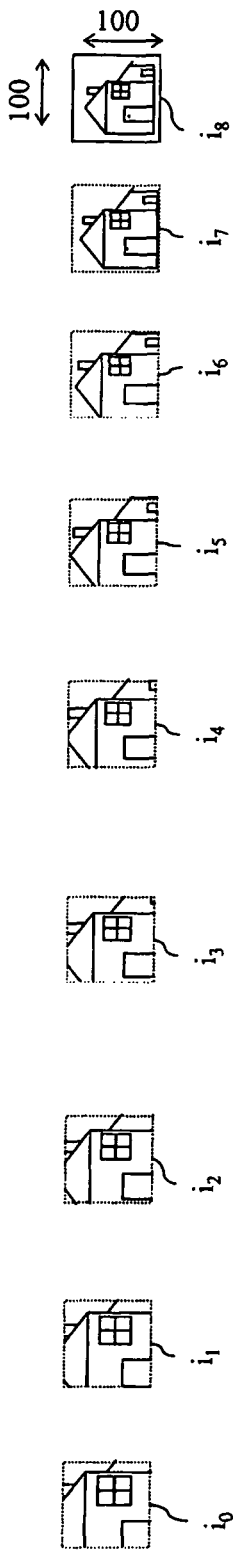
FIG. 7 is an example of a zoom out achieved according to the method of zooming out of the invention.

FIG. 7 shows the graphical rendition of the zoom out, i.e. the progressive display, during a factor 2 zoom out operation according to the invention.

For simplicity, the central point of the zoom is fixed here at the center of the image $i_0$.

As shown in Table 2, image $i_0$ is the initial image with respect to which the user requests a zoom out by a factor of 2. This image is of resolution $R_A$.

As from the following image, the zoom out operation is initiated.

To do this, the variable identifying the resolution for decoding is modified by decrementing its value, and also the current resolution $R_A$ is modified in order to identify the new resolution $R_N$.

Image $i_1$ is then decoded at the resolution $R_N$ and stored in the memory BI in the format 53×53. The processing means 38 perform an enlargement by a factor of 1.875 in order to obtain a display size of the image $i_1$ of 100×100.

Similarly, the images $i_2$ to $i_4$ are respectively decoded in the format 57×57, 61×61 and 67×67 in order then to be stored in the buffer memory BI. These images are of resolution $R_N$. Next, these images are enlarged by a factor respectively of 1.75, 1.625 and 1.5 in order to be displayed at a size of 100×100.

During that processing, the supplementary data concerning the edges of the following images $i_5$ to $i_8$ (these images being stored in the buffer memory BD) have been received after a request to the server and are concatenated with the respective images in the buffer memory BD, as illustrated in FIG. 6.

Next, these images $i_5$ to $i_8$ are decoded at resolution $R_N$ taking into account the supplementary data received. The window for decoding is respectively 72×72, 80×80 and 88×88. Next, these images are enlarged by a factor respectively of 1.375 and 1.25 and 1.125 in order to be displayed at a size of 100×100.

Finally, image $i_8$ of size 100×100 and of resolution $R_N$ is decoded and displayed as well as the following images of the video sequence.

Figure 8:
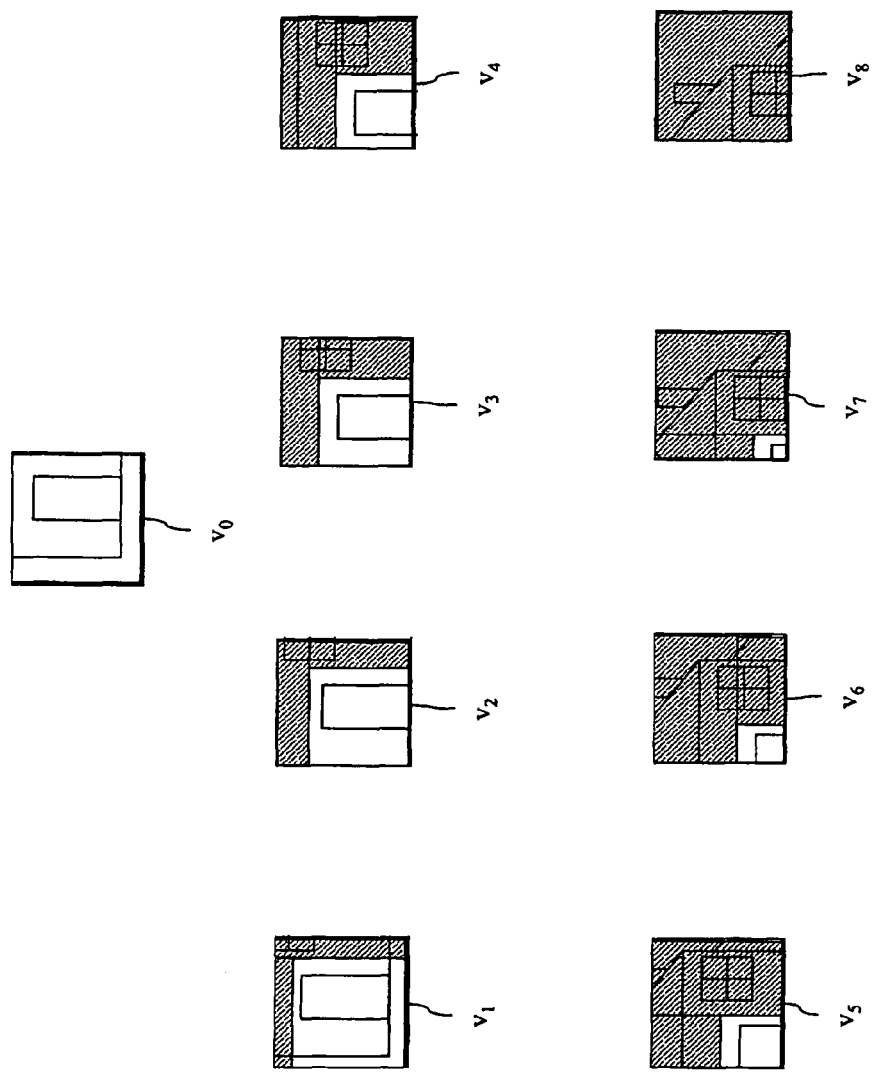
FIG. 8 is an example of panning within an image.

FIG. 8 represents the different views obtained further to a panning operation, i.e. a spatial displacement in the image.

It is assumed in the example that the images of the video sequence represent a fixed scene.

Just after the display of view $v_0$, the user requests a panning operation in the image by several pixels towards the upper right corner of the image. The result of the movement requested corresponds to the final view $v_8$.

However, in order not to interrupt the video sequence, a progressive display is implemented according to the invention, making it possible to obtain the missing data corresponding to the movement. Thus, during that progressive display, the supplementary data are requested in order to obtain the data enabling the display of the new regions further to the panning.

Thus, the intermediate views ($v_1$ to $v_8$) of the progressive display are displayed. That display enables a smooth and regular pan between the initial view $v_0$ and the final view $v_8$.

The cross-hatched regions on each of the views in FIG. 8 illustrate the new spatial region to decode for each image with respect to the initial view $v_0$ which is the spatial reference.

It should be noted that images $i_1$ to $i_8$ stored in the buffer memories BD and BI before the panning operation have the same spatial reference $v_0$.

Figure 9:
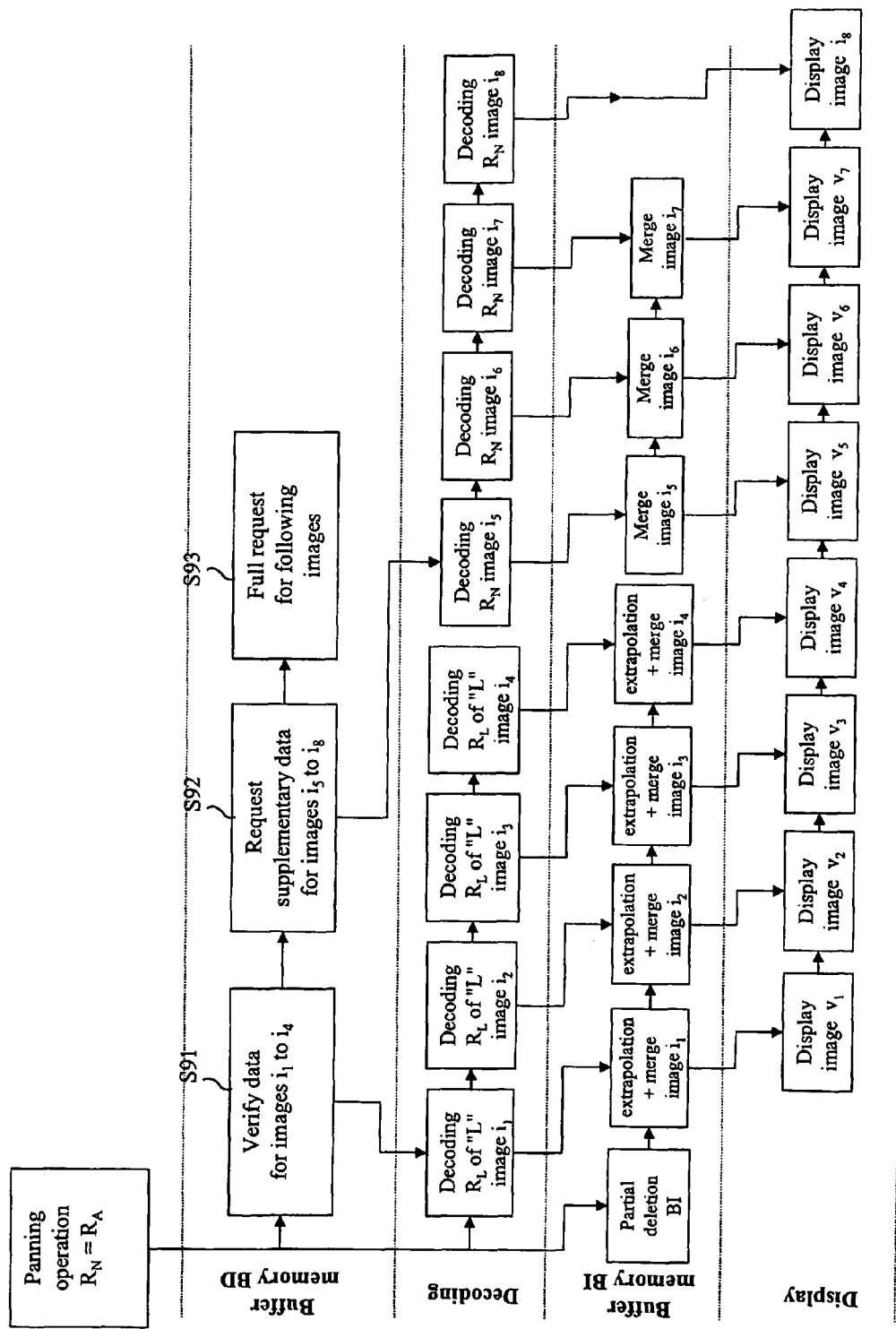
FIG. 9 shows the operations to perform in order to pan according to the invention.

With reference to FIG. 9, a description is now given of the different steps performed when a panning operation is requested by the user in a current resolution $R_N$.

The first step consists, for the first images $i_1$ to $i_4$, of decoding the data for the resolutions lower than the current resolution and which are stored in the memory BD, these data however entirely covering the new L-shaped region arising from the pan and represented in FIG. 8.

Given that the L-shaped region is of small size for the images $i_1$ to $i_4$ (views $v_1$ to $v_4$ in FIG. 8), it is probable that at a resolution $R_L$ less than or equal to the current resolution $R_N$ the encoded data corresponding to the L-shaped region have already been transmitted and stored in the memory BD (step S91).

Thus, the two image portions composing the "L" at resolution $R_L$ are decoded.

At the time of the display, the image portions forming the "L" which have been decoded at the resolution $R_L$ are extrapolated to reach the initial resolution $R_N$.

It is possible that the quality of the image composing the "L" is of lower quality than the rest of the image but the rendition gives quite a good idea of the real content of the offset image.

Thus, as the data are in memory, no supplementary information is requested for the first images of the video sequence for a panning operation. On account of that, this makes it possible to rapidly process the first images following the panning operation without leading to stoppage of the video sequence.

For the following images, for example, the images $i_5$ to $i_8$, a request is sent to request supplementary data (step S92).

For reasons of speed, only a sub-portion of the missing encoded data may be requested for the first images $i_5$ and $i_6$ and the entirety of the encoded data may be requested for the images $i_7$ to $i_8$. That sub-portion corresponds to the same spatial region, but with a lower level of quality. This makes it possible to receive data rapidly since the volume of those data is low. Furthermore, since the requests only aim to obtain supplementary data, the task of the server is reduced with respect to the techniques of the prior art.

The following requests sent to the server are those sent when operation is normal. Thus, the object of those requests is to request complete images (step S93).

The implementation of the policy for obtaining missing encoded data depends on the reactivity of the network and may be performed by the decision means 35 of FIG. 2a.

It is also possible to make that request later if the panning operation is of small magnitude with respect to the viewing window.

In parallel with that first step, the images of memory BI are modified.

This is because, before the panning operation, the decoded images contained in the buffer memory BI only contain a sub-portion or even no information on the L-shaped portions in the buffer memory BI, arising from the pan.

More particularly, only the portions that are not cross-hatched in FIG. 8 are kept in the buffer memory BI, the cross-hatched portions corresponding to the new portions of the images to be decoded and displayed further to a panning operation.

Thus, the decoding means 37 decode the L-shaped portions of each image which are then concatenated respectively with the images already decoded in the memory BI.

Those images are then processed and displayed at the desired frame rate.

In the implementations already described of the operations of zooming in, zooming out and panning, the buffer memories BD and BI are such that the size of the buffer memory BD of the encoded images is twice as great as the size of the buffer memory BI. However, according to the capability of the client machine, different memory sizes can be allocated and, for example, may be greater for each of those client machines.

The fact of having a high memory size for each of those buffer memories ensures that the progression of the spatial navigation operations will be executed rapidly, smoothly and without juddering during the display in the video sequence.

According to a variant embodiment, the size of the buffer memories may vary according to the operation of spatial navigation requested by the user.

Figure 10:
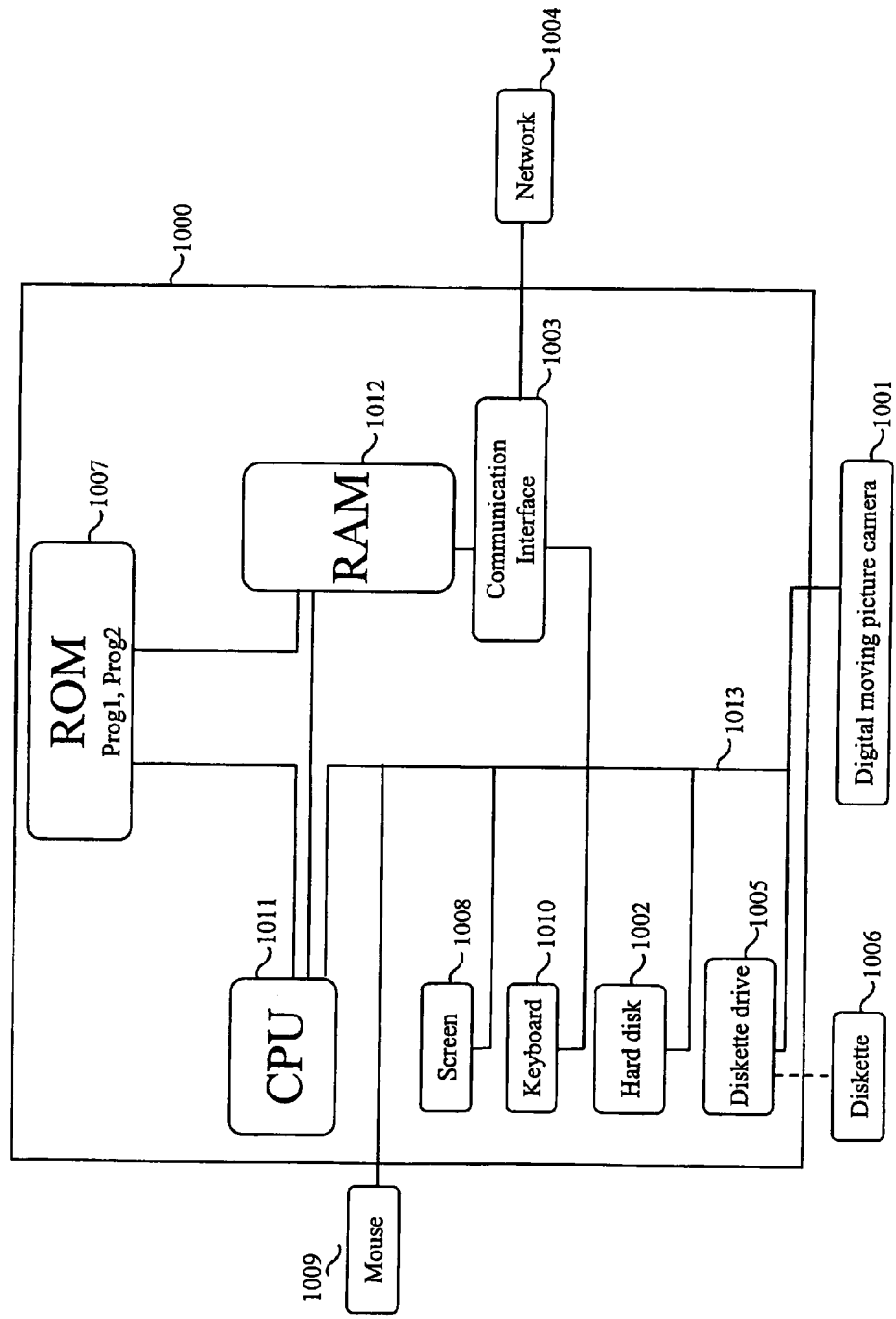
FIG. 10 is a diagrammatic representation of an apparatus in which the invention is implemented.

With reference to FIG. 10, a description will now be given of a device which has all the means necessary for the implementation of the method of displaying images of the video sequence according to the invention.

That device is, for example, embedded in a client machine of a communication network such as the system 21 of the network 22 of FIG. 1.

FIG. 10 represents an information processing device or machine adapted to operate as a device for displaying images of a video according to the invention.

According to the embodiment chosen, the device may for example be a micro-computer 1000 connected to different peripherals, for example a digital camera 1001 for the capture of images or any other image acquisition or storage device, such as a scanner, supplying images to the computer. These images may be stored in the storage means available to the micro-computer, such as a hard disk 1002.

The micro-computer 1000 comprises for example a communication interface 1003 connected to a communication network 1004, for example the Internet network, and which is adapted to transmit and receive digital information.

The micro-computer 1000 also comprises means for storing data such as the hard disk 1002, a floppy drive 1005 enabling data to be written onto a diskette 1006 and that data to be read. The micro-computer may also comprise a compact disc reader, not shown (CDROM or DVDROM) on which the images of the video may be stored, as well as a computer card (PC-CARD) reader, also not shown.

According to a variant, the program or programs enabling device 1000 to implement the invention are stored on the hard disk 1002.

According to another variant, the executable code or codes of those programs are stored in a ROM (Read Only Memory) 1007 of the micro-computer.

In general terms, an information storage means, which can be read by a micro-computer or microprocessor, whether integrated or not into that micro-computer, and which may possibly be removable, is adapted to store a program implementing the method according to the invention The micro-computer 1000 further comprises a screen 1008 for viewing the images and a pointing device (not shown), such as a mouse 1009 or optical stylus, or a keyboard 1010, so as to be able to interact with the program.

The micro-computer comprises a central processing unit (CPU) 1011, for example a microprocessor, which controls and directs the execution of the instructions of the program or programs relative to the invention stored in the Read Only Memory ROM 1007 or in the other storage means described.

The micro-computer 1000 also comprises a Random Access Memory RAM 1012. The RAM may, in particular, comprise registers adapted to store the variables created and modified during the execution of the program or programs relative to the invention.

A communication bus 1013 enables communication between the different elements of the device 1000 and the elements connected thereto.

It will be noted that the representation of the bus 1013 is non-limiting.

The client machine in which, for example, is embedded the device of FIG. 10, may, for example, implement the JPIP protocol (JPEG2000 Internet Protocol).

Of course, the present invention is in no way limited to the embodiments described and represented, but encompasses, on the contrary, any variant form within the capability of the person skilled in the art.

The invention claimed is:

1. A method of displaying temporally successive images that constitute a video sequence during spatial navigation in the video sequence in order to pass from a first viewing mode to a second viewing mode over successive images of the video sequence, the video sequence comprising encoded images continuously transmitted from a server to a client machine so as to allow a smooth progressive display of the video sequence on said client machine's side, the client machine decoding the encoded images before displaying, wherein said method comprises the following steps, performed by the client machine, during the navigation between the first and the second viewing mode:
   sending to the server at least one request for obtaining supplementary data with respect to encoded images to be decoded and displayed according to the second viewing mode, which were received beforehand;
   while awaiting the reception of a response to said at least one request and before the reception of said response:
   processing according to the second viewing mode at least one decoded image to be displayed, which was received and decoded beforehand and which precede, in the video sequence, said encoded images to be decoded and displayed, the processing applied modifying the decoded image; and
   displaying said at least one processed decoded image after the display of an image of current resolution, which has been processed according to the first viewing mode.

2. A method according to claim 1, wherein the method further comprises the following steps:
   receiving supplementary data in response to said at least one request, and concatenating the supplementary data received respectively with the encoded images to be displayed and which were received beforehand.

3. A method according to claim 1, wherein the method further comprises the following steps:
   storing the encoded images to be displayed in a first memory and, storing the corresponding decoded images to be displayed in a second memory after their decoding.

4. A method according to claim 1, wherein the step of processing according to the second viewing mode at least one decoded image, and the step of displaying said at least one processed decoded image, are performed on a predetermined batch of temporally contiguous images.

5. A method according to claim 1, wherein the spatial navigation consists of a zoom in.

6. A method according to claim 1, wherein the spatial navigation consists of a zoom out.

7. A method according to claim 1, wherein the spatial navigation consists of a pan in the images of the video sequence.

8. A non-transitory computer readable storage medium having a computer program stored thereon, said program containing instructions enabling the implementation of the method of displaying images of a video sequence according to claim 1, when that program is loaded and run by a computer system.

9. A method according to claim 2, wherein the method comprises the following steps:
   decoding encoded images to be displayed comprising supplementary data of images received in response to an earlier request,
   processing at least one decoded image according to the second viewing mode, and
   displaying said at least one processed image.

10. A method according to claim 5, in which the sending step comprises:
    sending at least one request for obtaining quality supplementary data concerning a first batch of encoded contiguous images to be displayed in the video sequence,
    sending at least one request for obtaining supplementary data relative to a higher resolution concerning a second batch of encoded contiguous images to be displayed, which, in the video sequence, follows said first batch of encoded contiguous images to be displayed.

11. A method according to claim 5, wherein, at the end of the passage from the first to the second viewing mode, the decoded images to be displayed are displayed at a higher resolution than the current resolution.

12. A method according to claim 6, in which the sending step comprises the sending of at least one request for obtaining supplementary data concerning the edges of the encoded images to be displayed which were received beforehand.

13. A method according to claim 6, wherein, on passage from the first to the second viewing mode, the decoded images to be displayed are displayed at a lower resolution than the current resolution.

14. A method according to claim 6, wherein, at the end of the passage from the first to the second viewing mode, the decoded images to be displayed are displayed at a lower resolution than the current resolution.

15. A method according to claim 6, wherein the images of the decoded video sequence are deleted.

16. A method according to claim 7, in which the sending step comprises the sending of at least one request for obtaining supplementary data concerning spatial regions of images to be displayed received beforehand corresponding to the pan and said spatial regions being located on the path of the pan.

17. A method according to claim 7, wherein the decoding of encoded images to be displayed is carried out at a resolution less than or equal to the current resolution.

18. A method according to claim 7, wherein the method further comprises a step of modifying the decoded images to be displayed by deleting the spatial regions not necessary for the display and by adding the supplementary data of the decoded spatial regions.

19. A method according to claim 17, wherein said images decoded at a resolution less than or equal to the current resolution are extrapolated to reach the current resolution.

20. A device for displaying temporally successive images which constitute a video sequence during spatial navigation in the video sequence in order to pass from a first viewing mode to a second viewing mode over successive images of the video sequence, the video sequence comprising encoded images continuously transmitted from a server to a client machine so as to allow a smooth progressive display of the video sequence on said client machine's side, the client machine decoding the encoded images before displaying, wherein said device comprises the following means, adapted to be used by the client machine, during the navigation between the first and the second viewing mode:
- means for sending to the server at least one request for obtaining supplementary data with respect to encoded images to be decoded and displayed according to the second viewing mode, which were received beforehand;
- means for processing according to the second viewing mode of at least one decoded image to be displayed, which was received and decoded beforehand and which precede, in the video sequence, said encoded images to be decoded and displayed, the processing applied modifying the decoded image; and
- means for displaying said at least one processed decoded image after the display of an image of current resolution, which was processed according to the first viewing mode,
- said processing and displaying means being activated while awaiting the reception of a response to said at least one request and before reception of said response.

21. A device according to claim 20, wherein the device further comprises:
- means for receiving supplementary data in response to said at least one request, and
- means for concatenating the supplementary data received respectively with the encoded images to be displayed and which were received beforehand.

22. A device according to claim 20, wherein the device further comprises:
- means for storing the encoded images to be displayed in a first memory and,
- means for storing the corresponding decoded images to be displayed in a second memory after their decoding.

23. A device according to claim 20, wherein the spatial navigation consists of a zoom in.

24. A device according to claim 20, wherein the spatial navigation consists of a zoom out.

25. A device according to claim 20, wherein the spatial navigation consists of a pan in the images of the video sequence.

26. A telecommunication system comprising a plurality of terminal devices connected via a telecommunication network, wherein it comprises at least one terminal device equipped with a device for displaying images of a video sequence according to claim 20.

27. A device according to claim 21, wherein the device comprises: means for decoding encoded images to be displayed comprising supplementary data of images received in response to an earlier request,
- means for processing at least one decoded image according to the second viewing mode, and
- means for displaying said at least one processed image.

28. A device according to claim 23, wherein the sending means are adapted to send:
- at least one request for obtaining quality supplementary data concerning a first batch of encoded temporally contiguous images to be displayed in the video sequence, and
- at least one request for obtaining supplementary data relative to a higher resolution concerning a second batch of encoded contiguous images to be displayed, which, in the video sequence, follows said first batch of encoded contiguous images to be displayed.

29. A device according to claim 23, wherein said displaying means are adapted to display the decoded images to be displayed at a higher resolution than the current resolution at the end of the passage from the first to the second viewing mode.

30. A device according to claim 24, in which the sending means are adapted to send at least one request for obtaining supplementary data concerning the edges of the encoded images to be displayed which were received beforehand.

31. A device according to claim 24, wherein the displaying means are adapted to display the decoded images to be displayed at a lower resolution than the current resolution on passage from the first to the second viewing mode.

32. A device according to claim 24, wherein the displaying means are adapted to display the decoded images to be displayed at a lower resolution than the current resolution at the end of the passage from the first to the second viewing mode.

33. A device according to claim 24, wherein the device comprises means for deleting the images of the decoded video sequence from the second memory.

34. A device according to claim 25, in which the sending means are adapted to send at least one request for obtaining supplementary data concerning spatial regions of images to be displayed received beforehand corresponding to the pan and said spatial regions being located on the path of the pan.

35. A device according to claim 25, wherein the means for decoding encoded images to be displayed are adapted to decode at a resolution less than or equal to the current resolution.

36. A device according to claim 25, wherein the device further comprises means for modifying the decoded images to be displayed by deleting the spatial regions not necessary for the display and by adding supplementary data of the decoded spatial regions.

37. A device according to claim 35, wherein the device comprises means for extrapolating said images decoded at a resolution less than or equal to the current resolution adapted to extrapolate said images to reach the current resolution.

* * * * *